(12) United States Patent
Miyagawa

(10) Patent No.: US 9,908,699 B2
(45) Date of Patent: Mar. 6, 2018

(54) TRANSPORT VEHICLE

(71) Applicant: MURATA MACHINERY, LTD., Kyoto-shi, Kyoto (JP)

(72) Inventor: Akinori Miyagawa, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 0 days.

(21) Appl. No.: 15/475,208

(22) Filed: Mar. 31, 2017

(65) Prior Publication Data
US 2017/0313512 A1 Nov. 2, 2017

(30) Foreign Application Priority Data
Apr. 27, 2016 (JP) ................................. 2016-089770

(51) Int. Cl.
| | | |
|---|---|---|
| *B65G 1/04* | (2006.01) | |
| *B65G 1/06* | (2006.01) | |
| *B65G 47/90* | (2006.01) | |

(52) U.S. Cl.
CPC ............. *B65G 1/0492* (2013.01); *B65G 1/06* (2013.01); *B65G 1/065* (2013.01); *B65G 47/905* (2013.01)

(58) Field of Classification Search
CPC .................................................. B65G 1/0492
See application file for complete search history.

(56) References Cited

U.S. PATENT DOCUMENTS

| | | | | |
|---|---|---|---|---|
| 4,403,801 A | * | 9/1983 | Huff ..................... | B25J 15/0023 294/119.3 |
| 4,984,680 A | * | 1/1991 | Hamano .............. | B65G 47/847 198/803.9 |
| 5,447,405 A | * | 9/1995 | Bayne ....................... | B65F 3/08 414/408 |
| 5,839,872 A | * | 11/1998 | Goto .................... | B65G 1/0435 414/277 |
| 6,149,377 A | * | 11/2000 | Loppnow ................ | B65B 43/14 198/692 |
| 6,619,905 B2 | * | 9/2003 | Stahler .................... | B66F 9/187 414/621 |
| 9,327,902 B2 | * | 5/2016 | Ogawa ................. | B65G 1/0492 |
| 2013/0142600 A1 | | 6/2013 | Ogawa | |
| 2015/0360882 A1 | * | 12/2015 | Girtman ................ | B65G 59/02 700/213 |

FOREIGN PATENT DOCUMENTS

WO     2012/029339 A1     3/2012

* cited by examiner

*Primary Examiner* — Thomas Randazzo
(74) *Attorney, Agent, or Firm* — Keating & Bennett, LLP

(57) ABSTRACT

A transport vehicle includes a pair of top arms that extend and retract, a pair of guides disposed below the pair of top arms, an adjuster that changes a spacing between the pair of guides, a cargo placement surface disposed below the pair of guides, a clamping detector that detects whether or not the cargo is being held between the pair of guides, and a controller. The controller pulls the cargo onto the cargo placement surface, then causes the adjuster to start a positioning operation as an operation to reduce a spacing between the pair of guides, and stops the positioning operation when the clamping detector detects that the cargo is being held between the pair of guides.

6 Claims, 11 Drawing Sheets

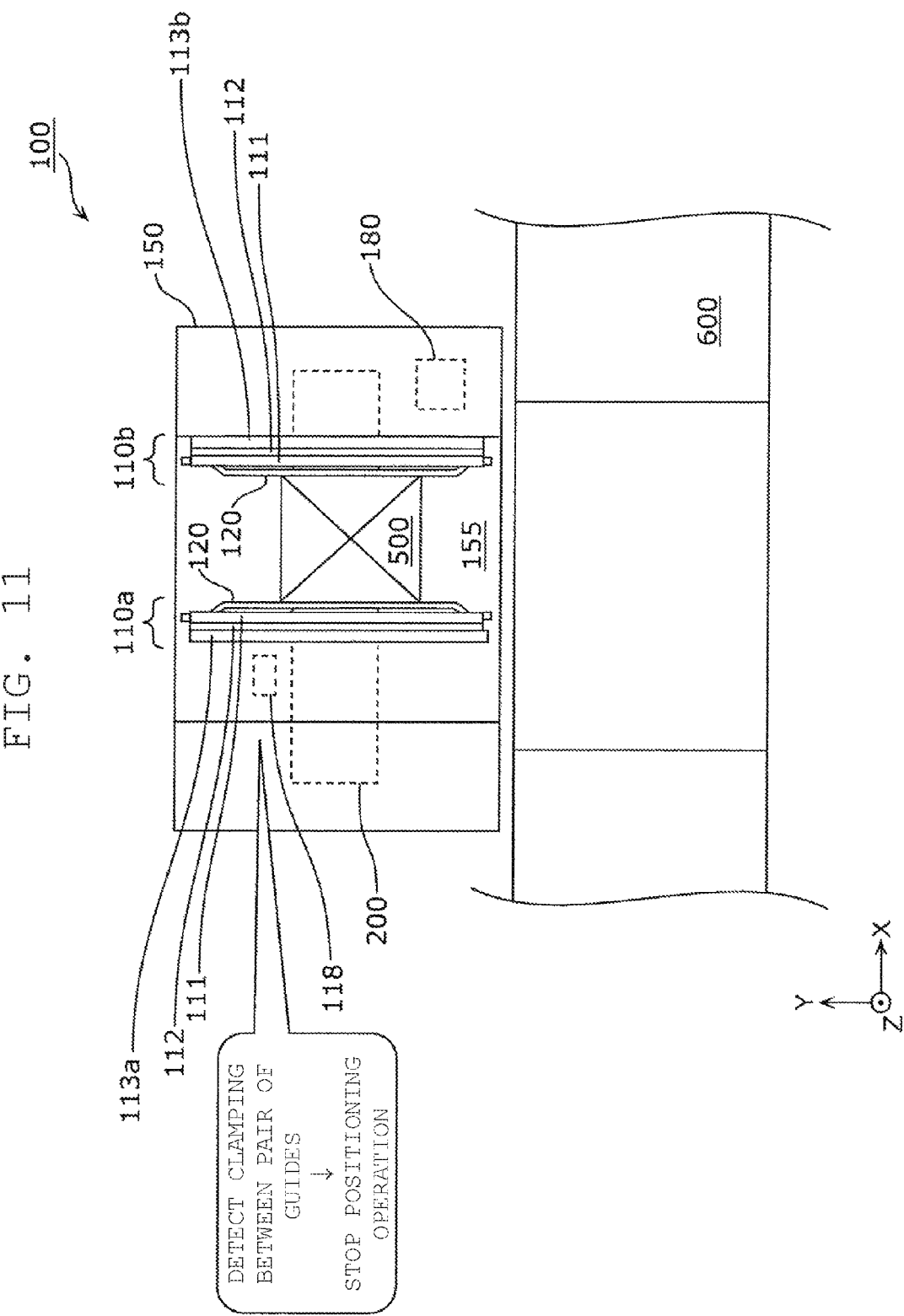

TRANSPORT VEHICLE

CROSS REFERENCE TO RELATED APPLICATIONS

This application claims the benefit of priority to Japanese Patent Application No. 2016-089770 filed on Apr. 27, 2016. The entire contents of this application are hereby incorporated herein by reference.

BACKGROUND OF THE INVENTION

1. Field of the Invention

The present invention relates to a transport vehicle that transports a cargo.

2. Description of the Related Art

Conventionally, there is a transport vehicle that receives a cargo from a rack, a conveyor, or the like, for example, and transports the cargo. Such a transport vehicle is provided with a transfer device for receiving and delivering a cargo from and to the rack, the conveyor, or the like. A method for transferring a cargo in the transfer device includes a push-pull system in which a cargo is pulled and pushed by hooks provided in arms that are extended and retracted.

For example, WO2012/029339 A discloses a transport vehicle that pulls a cargo by openable and closable hooks provided at ends of a pair of right and left extendable and retractable arms. In this transport vehicle, a cargo is clamped between the pair of right and left arms before being pulled, and the cargo is positioned. Thus, for example, at the time of subsequent unloading of the cargo, it is possible to unload the cargo in an accurate position.

In the transport vehicle that receives and delivers a cargo by the push-pull system, the stability at the time of reception and delivery, the presence of an object on the side of the cargo, or the like is considered. For example, the transport vehicle is configured such that a cargo is caught by the hooks in positions above a center part of the cargo. That is, the pair of right and left arms are extended and retracted at positions above the center part of the cargo.

For example, there is considered a case where a cargo moving on a roller conveyor is stopped by a stopper in contact with the lower side surface of the cargo. In a transport vehicle that receives and delivers this cargo by the push-pull system, it is necessary to avoid interference between the stopper and at least one of the pair of right and left arms. For this reason, the pair of right and left arms are extended and retracted in positions above a center part of the cargo.

Among cargoes to be received and delivered, for example, there exists a cargo with its top part being relatively vulnerable to external forces, such as an open-top cardboard box or a foldable container. Thus, when such a cargo is clamped between the pair of right and left arms, the cargo may be deformed due to clamping force by the pair of right and left arms.

SUMMARY OF THE INVENTION

In view of the conventional problems, preferred embodiments of the present invention provide a transport vehicle that transfers a cargo by use of a pair of right and left arms that extend and retract, the transport vehicle being capable of transferring the cargo in a safe and accurate manner.

A transport vehicle according to a preferred embodiment of the present invention includes a pair of laterally arranged, extendable and retractable arms, which pull or push a cargo by use of openable and closable hooks disposed at both ends in a longitudinal direction of each of the pair of arms; a pair of guides that are disposed below the pair of arms and arranged laterally; an adjuster that changes a spacing between the pair of guides; a cargo placement surface that is disposed below the pair of guides and defines a placement surface for the cargo; a clamping detector that detects whether or not the cargo is being held between the pair of guides; and a controller that controls operations of the pair of arms and the adjuster. The controller (a) extends and retracts the pair of arms to pull the cargo onto the cargo placement surface, (b) then causes the adjuster to start a positioning operation as an operation to reduce the spacing by the pair of guides, and (c) stops the positioning operation when the clamping detector detects that the cargo is being held between the pair of guides.

With this configuration, the pair of laterally arranged arms are extended and retracted to pull the cargo into the transport vehicle, and thereafter the cargo is held between the pair of the right and left guides located below the pair of arms. Thus, the cargo is positioned.

That is, the cargo is positioned laterally on the transport vehicle by the pair of guides. Thus, for example, in a placement location for the cargo before it is pulled (a rack, a conveyor, etc.), it is not necessary to position the cargo by use of the pair of arms. The pair of guides are located below the pair of arms. For this reason, the cargo pulled into the transport vehicle is held between the pair of guides in a position close to the bottom of the cargo, for example. Thus, for example, even when the cargo is a cargo with a top that is vulnerable to external force, such as an open-top cardboard box or a foldable container, it is possible to prevent the cargo from being substantially deformed.

Thus, with a transport vehicle according to a preferred embodiment of the present invention, it is possible to significantly reduce or prevent deformation of a cargo to be pulled and place the cargo in a normal position on the transport vehicle. As a result, for example, when the cargo is pushed to be placed into the rack or the like, the cargo can be placed in a normal position. As thus described, with a transport vehicle according to a preferred embodiment of the present invention, it is possible to transfer the cargo in a safe and accurate manner.

A transport vehicle according to a preferred embodiment of the present invention may further include a contact detector that detects that one of the pair of arms has come into contact with the cargo. The adjuster may change a spacing between the pair of arms and the spacing between the pair of guides, while maintaining a state where inner surfaces of the pair of guides are located between the pair of arms in a plan view. The controller may (a1) extend the pair of arms, (a2) then cause the adjuster to reduce the spacing of the pair of arms, and (a3) retract the pair of arms after the contact detector has detected that the one of the pair of arms has come into contact with the cargo, to pull the cargo onto the cargo placement surface.

With this configuration, the adjuster is able to change both the spacing between the pair of arms and the spacing between the pair of guides. Further, triggered by one of the pair of arms coming into contact with the cargo, the operation to pull the cargo is able to be started. Hence, it is possible to complete pulling of the cargo into the transport vehicle without holding the cargo between the pair of arms even once.

In a transport vehicle according to a preferred embodiment of the present invention, the adjuster may bias the one of the pair of arms by use of a first spring to reduce the spacing between the pair of arms, and the contact detector may detect a change in length of the first spring to detect that the one of the pair of arms has come into contact with the cargo.

With this configuration, one of the pair of arms moves by biased force generated by the first spring, and therefore, it is possible to reduce force that is applied to the cargo when the one arm comes into contact with the cargo. Further, since the contact is able to be detected based on a change in length of the first spring caused by this contact, it is possible to detect the contact with a relatively simple configuration.

In a transport vehicle according to a preferred embodiment of the present invention, the adjuster may bias one of the pair of guides by use of a second spring with a spring constant larger than a spring constant of the first spring, to perform the positioning operation.

With this configuration, one of the pair of guides is biased using the second spring that is harder than the first spring, and hence the cargo on the transport vehicle is able to be held between the pair of guides. Accordingly, on the cargo placement surface, positioning of the cargo in a laterally normal position, that is, positioning of the cargo, is performed accurately. Since a biased force generated by the second spring is used to hold (clamp) the cargo, even when there is a time lag between the time of detection that the cargo is being held (a clamped state) between the pair of guides and the stoppage of the positioning operation (a clamping operation), it is unlikely that an excessive load is applied to the cargo by the pair of guides.

In a transport vehicle according to a preferred embodiment of the present invention, one of the pair of guides may be mounted to a first base that is movably disposed in the cargo placement surface. The other of the pair of guides may be mounted to a second base whose position with respect to the cargo placement surface is fixed. The adjuster may move the first base to perform the positioning operation. The clamping detector may detect that the one of the pair of guides is displaced with respect to the first base and that the other of the pair of guides is displaced with respect to the second base, to detect that the cargo is being held between the pair of guides.

With this configuration, by detecting displacement of each of the pair of guides with respect to the member (the first base or the second base) mounted with the guide, the cargo is detected to be in the clamped state. That is, the clamped state is detected by a mechanical change in each of the pair of guides due to both of the pair of guides coming into contact with the cargo. Thus, accurate detection is possible with a relatively simple configuration, for example.

Further, preferred embodiments of the present invention are able to be realized as transferring methods including characteristic processing that is conducted by a transport vehicle according to any of the above preferred embodiments of the present invention. Moreover, preferred embodiments of the present invention are able to be realized as non-transitory computer readable media including a program that causes a computer to execute each process or step included in the transferring methods. The program can be distributed through a communication medium such as the Internet, or a recording medium such as a DVD, for example.

According to various preferred embodiments of the present invention, it is possible to provide a transport vehicle that transfers a cargo by use of a pair of right and left arms that extend and retract, the transport vehicle being capable of moving the cargo in a safe and accurate manner.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 11 is a sixth plan view illustrating an operation at the time when the transport vehicle according to a preferred embodiment of the present invention pulls a cargo.

DETAILED DESCRIPTION OF THE PREFERRED EMBODIMENTS

Hereinafter, transport vehicles according to preferred embodiments of the present invention are described with reference to the drawings. Note that each figure is a schematic view, and not an exact illustration.

The preferred embodiments described below are comprehensive or specific examples. A numerical value, a shape, a material, a constituent element, an arrangement position and a connected arrangement or structural configuration of constituent element, and the like shown in the following preferred embodiments are merely examples, and not intended to limit the present invention. Further, among the constituent elements in the following preferred embodiments, constituent elements not recited in the independent claim showing the most generic concept are described as arbitrary constituent elements.

First, with reference to FIGS. 1 to 4, a description is given of a configuration overview of a transport vehicle 100 according to a preferred embodiment of the present invention.

Figure 1:
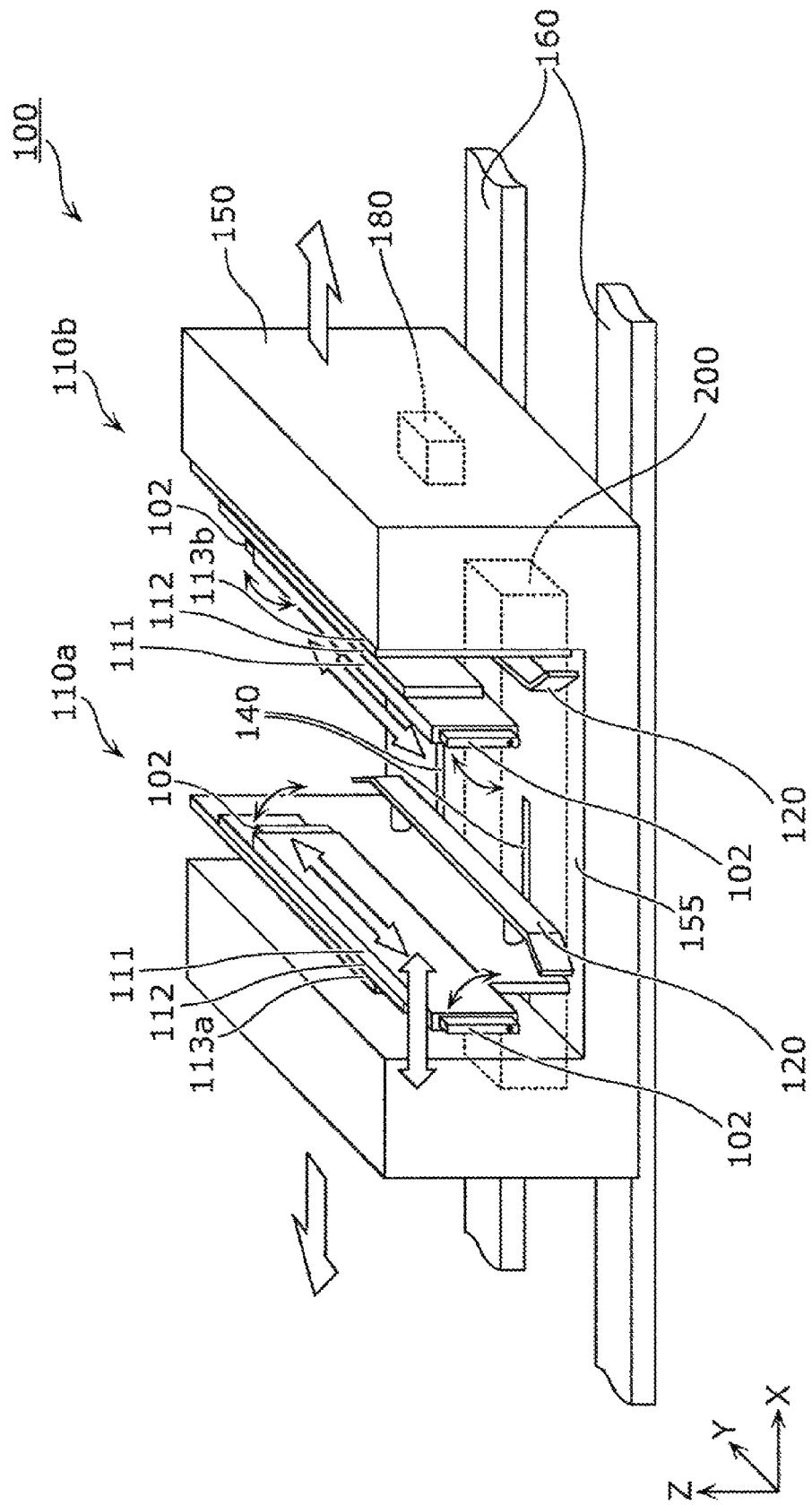
FIG. 1 is a perspective view illustrating a configuration overview of a transport vehicle according to a preferred embodiment of the present invention.
Figure 2:
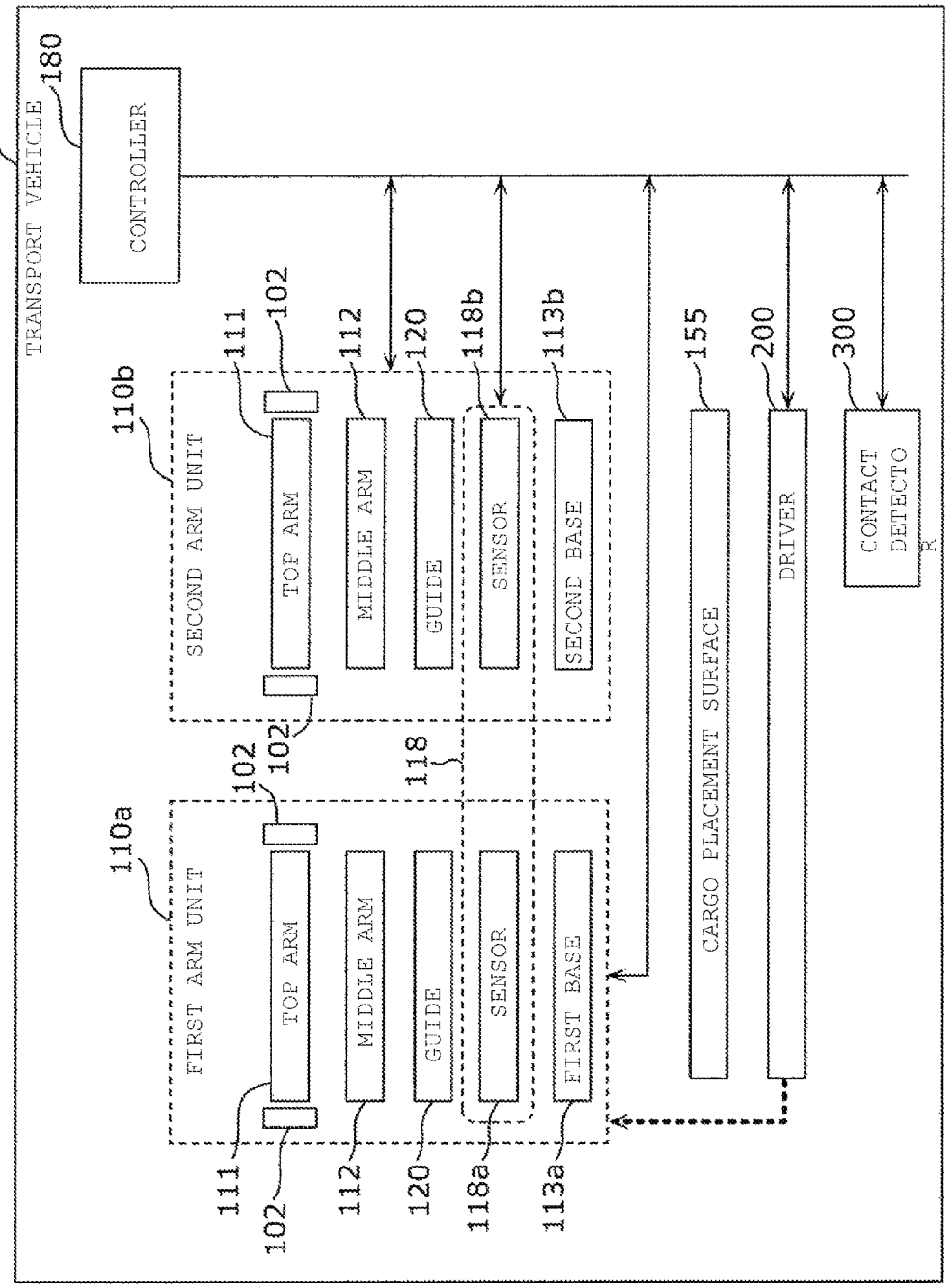
FIG. 2 is a block diagram illustrating the configuration overview of the transport vehicle according to a preferred embodiment of the present invention.

FIG. 1 is a perspective view illustrating a configuration overview of the transport vehicle 100 according to the present preferred embodiment. FIG. 2 is a block diagram illustrating the configuration overview of the transport vehicle 100 according to the present preferred embodiment.

As illustrated in FIG. 1, the transport vehicle 100 in the present preferred embodiment is provided with a first arm unit 110a, a second arm unit 110b, an adjuster 200, a cargo placement surface 155, and a controller 180. These elements such as the first arm unit 110a are disposed in a body 150. In FIG. 1 and the subsequent figures, constituent elements related to transfer of a cargo are illustrated, and illustration and descriptions of other constituent elements (wheels, a driver that drives the wheels, etc.) are omitted.

In the present preferred embodiment, the transport vehicle 100 travels on a travelling track 160 preferably including two rails disposed alongside each other. That is, in accordance with an instruction from a host computer, for example, the transport vehicle 100 travels on the travelling track 160 to move to a predetermined position, and receives and delivers a cargo in that position.

Specifically, the cargo is transferred by the first arm unit 110a and the second arm unit 110b.

The first arm unit 110a includes a first base 113a, a middle arm 112 mounted to the first base 113a, a top arm 111, and a guide 120. The second arm unit 110b includes a second base 113b, a middle arm 112 mounted to the second base 113b, a top arm 111, and a guide 120.

In each of the first arm unit 110a and the second arm unit 110b, the top arm 111 and the middle arm 112 define a telescopic structure. That is, when the middle arm 112 is slid so as to project by an extension and retraction driving device (not illustrated) including a motor and the like, the top arm 111 slides so as to project with respect to the middle arm 112 in conjunction with this operation. On the other hand, when the middle arm 112 is reversely slid so as to be retracted, the top arm 111 slides so as to be retracted with respect to the middle arm 112 in conjunction with this operation.

As thus described, in the present preferred embodiment, the transport vehicle 100 is provided with a pair of extendable and retractable top arms 111 that are arranged laterally (in an X-axis direction in the present preferred embodiment). At both ends in a longitudinal direction (a Y-axis direction in the present preferred embodiment) of each of the pair of top arms 111, openable and closable hooks 102 are disposed. The pair of top arms 111 are retracted or extended with the cargo caught by these hooks 102, and are thus able to pull or push the cargo.

For example, in FIG. 1, when the Y-axis direction negative-side (the front side in FIG. 1) is the "front" of the transport vehicle 100, the two hooks 102 at the front ends of the pair of top arms 111 which have extended to the front rotate so as to fall inward (the two hooks 102 are closed), so that the cargo is able to be pulled between the pair of top arms 111. Subsequently, the pair of top arms 111 are retracted, and the cargo caught by the two hooks 102 is pulled onto the cargo placement surface 155.

When the cargo is placed on the cargo placement surface 155, two hooks 102 at the rear ends of the pair of top arms 111 are closed, and by the pair of top arms 111 moving to the front, the cargo caught by the two rear-end hooks 102 are pushed from the cargo placement surface 155 to a rack or the like in front of the transport vehicle 100.

A spacing between the pair of top arms 111 which are able to pull and push the cargo as in the above operation is changed by the adjuster 200. Specifically, the adjuster 200 moves the first arm unit 110a in the X-axis direction to change a distance between the first arm unit 110a and the second arm unit 110b fixed to the body 150. This leads to a change in spacing between the pair of top arms 111. Note that the body 150 of the transport vehicle 100 includes a plurality of linear rails 140 that laterally moves the first arm unit 110a. The first arm unit 110a moves along the plurality of linear rails 140 in response to receiving a force from the adjuster 200.

Further, in each of the first arm unit 110a and the second arm unit 110b, the guide 120 is disposed below the top arm 111. By holding (clamping) the cargo pulled onto the cargo placement surface 155 from the right and left, the pair of laterally arranged guides 120 are able to laterally position the cargo on the cargo placement surface 155.

A clamping operation (a positioning operation) performed by the pair of guides 120 at the time of positioning is driven by the adjuster 200. That is, the spacing between the pair of laterally arranged guides 120 is changed by the adjuster 200. Specifically, as described above, the first arm unit 110a moves along the plurality of linear rails 140 in response to receiving the force from the adjuster 200. This leads to a change in spacing between the pair of guides 120.

An operation of each of the first arm unit 110a, the second arm unit 110b, and the adjuster 200 is controlled by the controller 180. The controller 180 is realized by, for example, a computer provided with an interface that performs input and output of information, a CPU (Central Processing Unit) that executes a control program, a memory, and the like.

Note that travelling control of the transport vehicle 100 may be performed by the controller 180, or may be performed by a computer or the like which is separate from the controller 180. That is, the controller 180 may only control transfer of a cargo, or may control all operations of the transport vehicle 100.

The transport vehicle 100 in the present preferred embodiment further includes a plurality of detectors that detect a state related to transfer of a cargo. Specifically, as illustrated in FIG. 2, the transport vehicle 100 is provided with a contact detector 300 and a clamping detector 118.

The contact detector 300 detects that the top arm 111 has come into contact with the cargo, the top arm 111 being one of the pair of top arms 111 and provided in the laterally movable first arm unit 110a.

The clamping detector 118 detects whether or not the cargo is being held between the pair of guides 120 (whether or not the cargo is clamped). In the present preferred embodiment, the clamping detector 118 includes sensors 118a and 118b. A sensor 118a is disposed in the first arm unit 110a, and a sensor 118b is disposed in the second arm unit 110b.

How the contact detector 300 and the clamping detector 118 detect the above contact and clamping is described with reference to FIGS. 3A-3B, and 4 along with a configuration overview of the adjuster 200.

Figure 3A:
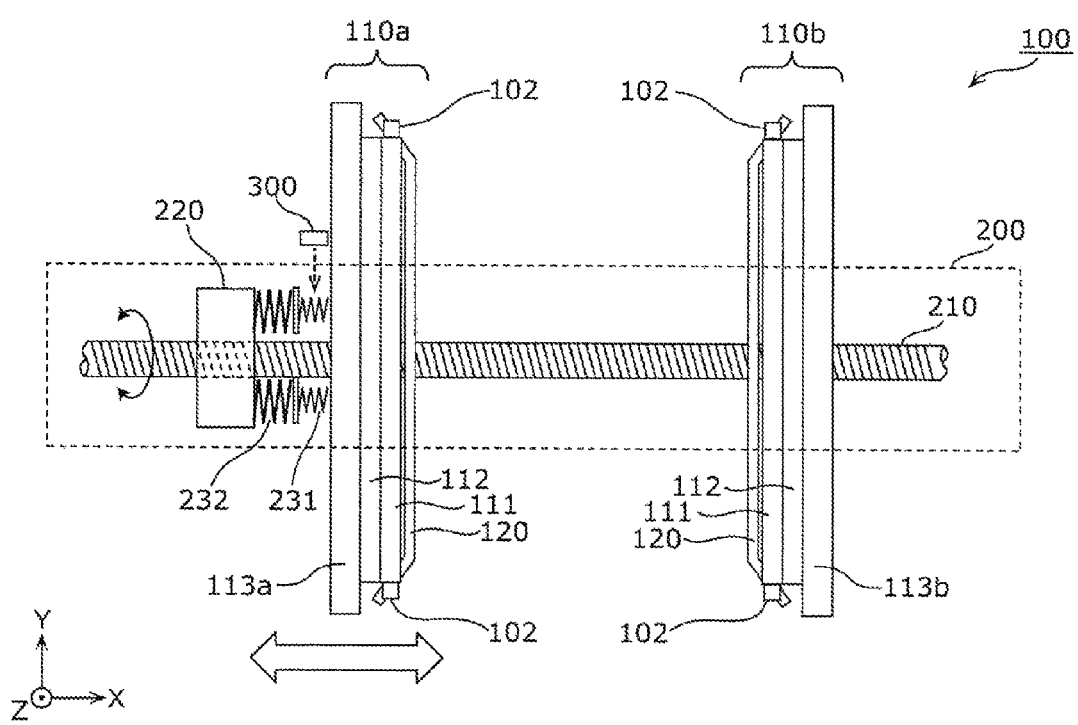
FIG. 3A is a plan view illustrating a configuration overview of an adjuster according to a preferred embodiment of the present invention.
Figure 3B:
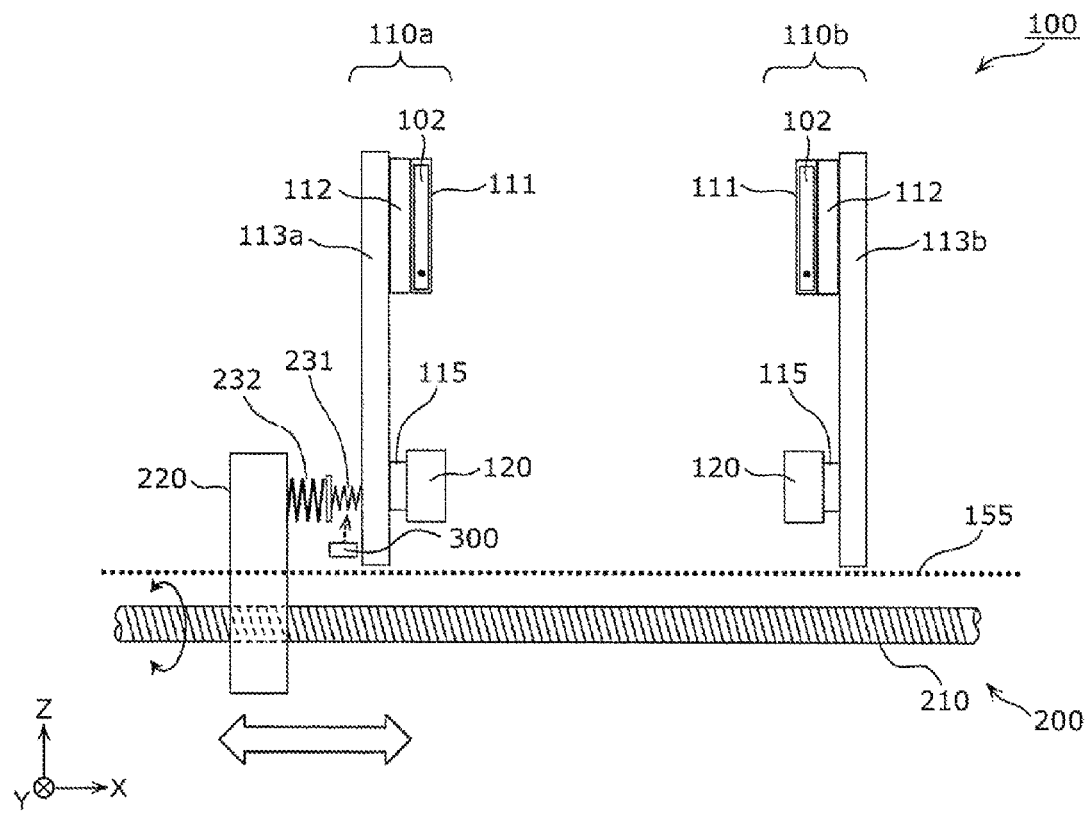
FIG. 3B is a front view illustrating the configuration overview of an adjuster according to a preferred embodiment of the present invention.

FIG. 3A is a plan view illustrating a configuration overview of the adjuster 200 in the present preferred embodiment, and FIG. 3B is a front view illustrating the configuration overview of the adjuster 200 in the present preferred embodiment. FIG. 4 is a view illustrating an example of arrangement positions of the clamping detector 118 (the sensors 118a and 118b) in the present preferred embodiment.

Figure 4:
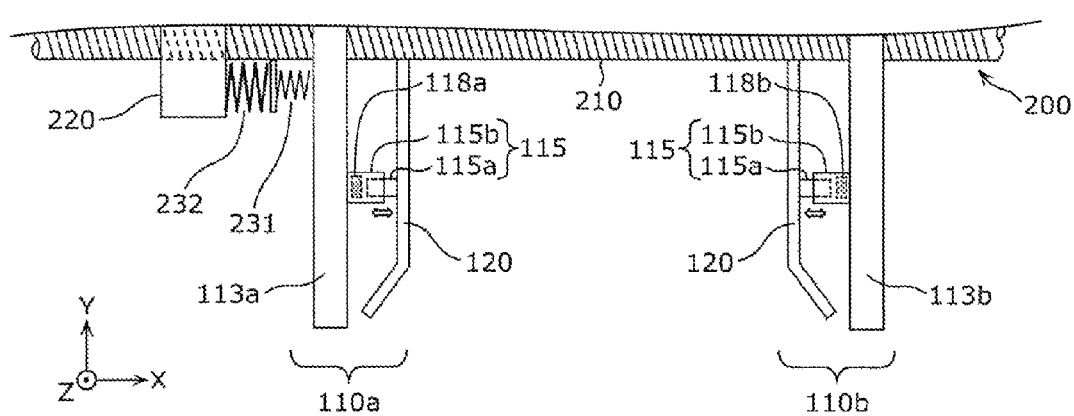
FIG. 4 is a view illustrating an example of arrangement positions of clamping detectors (two sensors) according to a preferred embodiment of the present invention.

In order to clarify an operation mechanism of the adjuster 200, in FIGS. 3A to 4, illustration of elements such as a support that supports a screw shaft 210 of the adjuster 200 and a motor that drives rotation of the screw shaft 210 is omitted. Further, in FIGS. 3A and 4, illustration of the cargo placement surface 155 is omitted, and in FIG. 3B, the cargo placement surface 155 is briefly illustrated by a dotted line. Moreover, in FIG. 4, for describing a mounting structure of each of the pair of guides 120, illustration of the right and left middle arms 112 and top arms 111 is omitted.

As illustrated in FIGS. 3A to 4, the adjuster 200 in the present preferred embodiment has a structure in which the first base 113a is moved by a ball screw, for example. Specifically, the adjuster 200 includes the screw shaft 210, a nut 220 that moves in an axial direction (the X-axis direction in the present preferred embodiment) of the screw shaft 210 by rotation of the screw shaft 210, and an elastic member disposed between the nut 220 and the first base 113a. In the present preferred embodiment, a first spring 231 and a second spring 232 disposed in series define the elastic member. As illustrated in FIG. 3A, two pairs of the first spring 231 and the second spring 232 are disposed between the nut 220 and the first base 113a, but at least one pair of the first spring 231 and the second spring 232 only needs to be disposed.

In the present preferred embodiment, a spring constant of the second spring 232 is larger than a spring constant of the first spring 231. That is, the second spring 232 is harder than the first spring 231. In other words, the first spring 231 is softer than the second spring 232. For example, the spring constant of the second spring 232 is about ten times as large as the spring constant of the first spring 231.

In such a configuration, the contact detector 300 is disposed so as to detect a change in length (expansion or contraction) of the first spring 231. In the present preferred embodiment, when an amount of contraction of the first spring 231 from its natural length exceeds a threshold (or when the length of the first spring 231 becomes a predetermined value or smaller), the contact detector 300 transmits a predetermined signal to the controller 180. That is, when the top arm 111 of the first arm unit 110a in an extended state comes into contact with the cargo, the first spring 231 contracts, and this is detected by the contact detector 300. Accordingly, the contact between the top arm 111 and the cargo is detected. At the time of this contact, since the top arm 111 moves by receiving biased force generated by the first spring 231, the force that is applied to the cargo by the top arm 111 is reduced.

For example, a case is assumed where, in order to pull a cargo placed in front of (in a lower portion in FIG. 3A) of the transport vehicle 100, the controller 180 causes the screw shaft 210 to be rotated normally (rotated clockwise when seen from the X-axis direction positive-side) with the pair of top arms 111 extended to the front. In this case, in FIGS. 3A and 3B, the nut 220 moves to the right, and the first base 113a is pushed to the right side via the first spring 231 and the second spring 232. At this time, the first spring 231 contracts in a larger degree than the second spring 232 by an inertia force, a friction force, and the like accompanying the movement of the first arm unit 110a. However, since the amount of contraction does not exceed the threshold, the contact between the top arm 111 and the cargo is not determined.

Thereafter, when the top arm 111 comes into contact with the cargo, the movement of the top arm 111 to the right side is regulated by the cargo, leading to further contraction of the first spring 231. By the amount of contraction exceeding the threshold at that point, the contact between the top arm 111 and the cargo is detected by the contact detector 300.

Note that a technique to detect a change in length of the first spring 231 by the contact detector 300 is not particularly limited. For example, a switch, which is disposed so as to be pressed when the amount of contraction of the first spring 231 exceeds the threshold, may be used as the contact detector 300. The contact detector 300 may detect a change in length of the first spring 231 by, for example, analyzing image data obtained by capturing an image of first spring 231.

When the contact detector 300 detects the contact between the top arm 111 and the cargo, the controller 180 controls the adjuster 200 so as to stop the movement of the first arm unit 110a and move the first arm unit 110a to the left side by a predetermined distance. This releases the state of the contact between the top arm 111 and the cargo, and thereafter, by control of the controller 180, the hooks 102 at the front ends of the pair of top arms 111 are closed, and the pair of top arms 111 are retracted. Thus, the cargo placed in front of the transport vehicle 100 is pulled onto the cargo placement surface 155 (cf. FIG. 1).

After the cargo has been pulled onto the cargo placement surface 155, the controller 180 moves the first arm unit 110a to the right again.

At this point, for example as illustrated in FIG. 3A, in a plan view, the inner surfaces of the pair of guides 120 are located between the pair of top arms 111. Further, as illustrated in FIG. 4, the left-side guide 120 is mounted to the movable first base 113a, and the right-side guide 120 is mounted to the second base 113b having a fixed position. Thus, when the first arm unit 110a moves, the spacing between the pair of top arms 111 and the spacing between the pair of guides 120 are changed while the state is maintained where the inner surfaces of the pair of guides 120 are located between the pair of top arms 111 in the plan view.

Specifically, when the controller 180 causes the first arm unit 110a to move to the right, the spacing between the pair of top arms 111 and the spacing between the pair of guides 120 are reduced, and the inner surfaces of the pair of guides 120 are located between the pair of top arms 111. Thus, when the spacing between the pair of top arms 111 and the spacing between the pair of guides 120 are reduced, the pair of guides 120, not the pair of top arms 111, come into contact with the cargo on the cargo placement surface 155. That is, the cargo is held between the pair of guides 120. Further, for example, as illustrated in FIGS. 1 and 3B, the pair of guides 120 are disposed below the pair of top arms 111, and thus hold a lower portion of the cargo from the right and left. Thus, the cargo is positioned. In this manner, the positioning operation for the cargo is performed.

In the present preferred embodiment, as illustrated in FIG. 4, one of the pair of guides 120 is mounted to the first base 113a via a joint 115, and the other of the pair of guides 120 is mounted to the second base 113b via a joint 115.

The joint 115 includes a rod 115b, and a support 115a that movably supports the rod 115b in the axial direction. An end of the rod 115b which projects from the support 115a is connected with the guide 120. The rod 115b is biased by an elastic member such as a spring in the direction of projecting from the support 115a. The joint 115 preferably is provided with a sensor that detects that the rod 115b has been pushed to the support 115a side, that is, the guide 120 has been pushed.

Specifically, a sensor 118a is disposed in the joint 115 in the first arm unit 110a, and a sensor 118b is disposed in the joint 115 in the second arm unit 110b.

In this configuration, when the pair of guides 120 hold the cargo, in each of the first arm unit 110a and the second arm unit 110b, the guide 120 moves the rod 115b to the support 115a side. As a result, each of the sensor 118a and the sensor 118b detects that the guide 120 has been pushed. As the sensor 118a, for example, there is preferably provided a micro photo sensor to detect, based on blockage of an optical axis by the rod 115b, that the rod 115b has been pushed, that is, the guide 120 mounted to the first base 113a is displaced with respect to the first base 113a. Similarly, in the sensor 118b, for example, a micro photo sensor is preferably provided.

That is, the clamping detector 118 including the sensor 118a and the sensor 118b detects that the cargo is being held between the pair of guides 120. Upon receipt of this detection result, the controller 180 controls the adjuster 200 to stop the positioning operation. That is, the controller 180 stops the operation of reducing the spacing between the pair of guides 120 (more specifically, the control of moving the first base 113a) performed by the adjuster 200.

The clamping detector 118 is a device which notifies the controller 180 that the cargo is being held between the pair of guides 120, for example, when a detection result from each of the sensor 118a and the sensor 118b shows that the guide 120 has been pushed. For example, a portion of the computer defining the controller 180 may be configured or programmed to function as the clamping detector 118. Alternatively, a microprocessor or the like separate from the controller 180 may be provided as the clamping detector 118 in the transport vehicle 100.

Each of the sensors 118a and 118b is not necessarily built in the joint 115, but may only be provided in the transport vehicle 100 in such a position and an aspect as to be able to detect that the guide 120 has been pushed.

An overview and a specific example of the operation of the transport vehicle 100 with the structure described above are described with reference to FIGS. 5 to 11.

Figure 5:
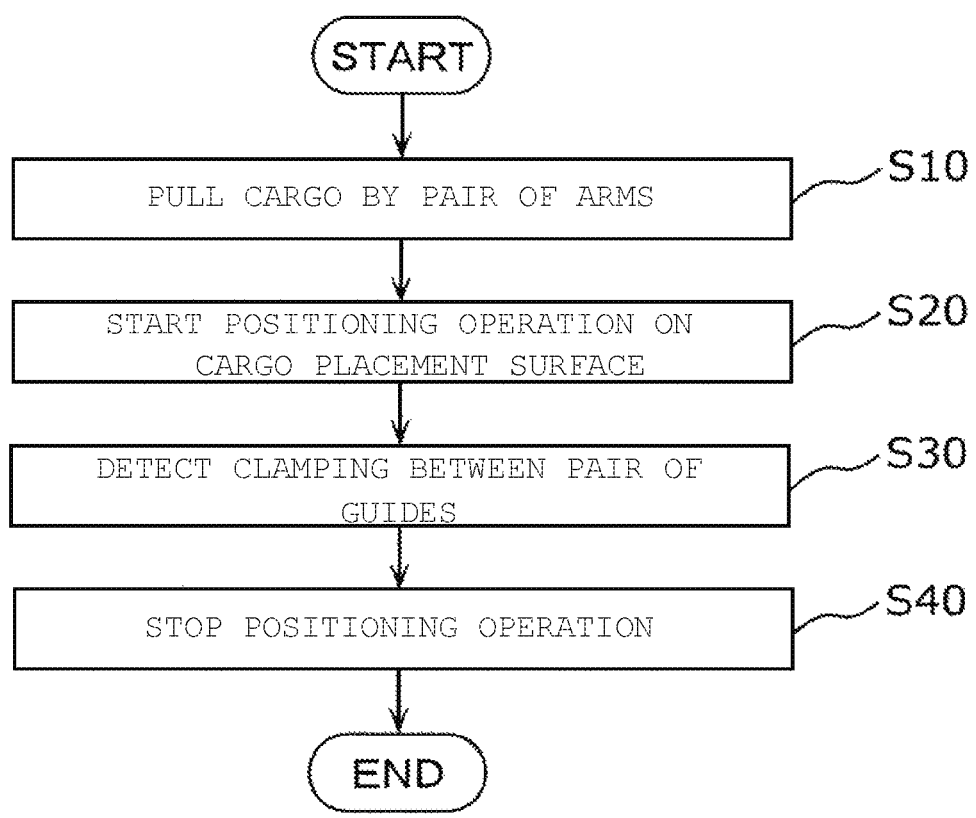
FIG. 5 is a flowchart illustrating an overview of an operation of a transport vehicle according to a preferred embodiment of the present invention.

FIG. 5 is a flowchart illustrating an overview of the operation of the transport vehicle 100 according to the present preferred embodiment.

As illustrated in FIG. 5, the controller 180 of the transport vehicle 100 according to the present preferred embodiment extends and retracts the pair of top arms 111 to pull a cargo onto the cargo placement surface 155 (S10). Next, the controller 180 causes the adjuster 200 to start the positioning operation as an operation to reduce the spacing between the pair of guides 120 (S20). When the clamping detector 118 detects that the cargo is being held between the pair of guides 120 (S30), the controller 180 stops the positioning operation (S40). That is, when confirming that the cargo has been clamped, the controller 180 causes the adjuster 200 to stop the operation of reducing the spacing between the pair of guides 120.

By the operation of the above example, the cargo placed on the rack, the conveyor, or the like is pulled onto the cargo placement surface 155 of the transport vehicle 100, and the position of the cargo is aligned to a normal position on the cargo placement surface 155. That is, the cargo is positioned on the cargo placement surface 155.

A specific example of this series of operations is described with reference to FIGS. 6 to 11. FIGS. 6 to 11 are first to sixth plan views illustrating the operation of the transport vehicle 100 according to the present preferred embodiment at the time of pulling the cargo.

Specifically, FIGS. 6 to 11 illustrate a series of operations of the transport vehicle 100, from pulling of a cargo 500 placed in a predetermined position of a rack 600 to positioning of the cargo 500. Note that illustration of the travelling track 160 is omitted.

Figure 6:
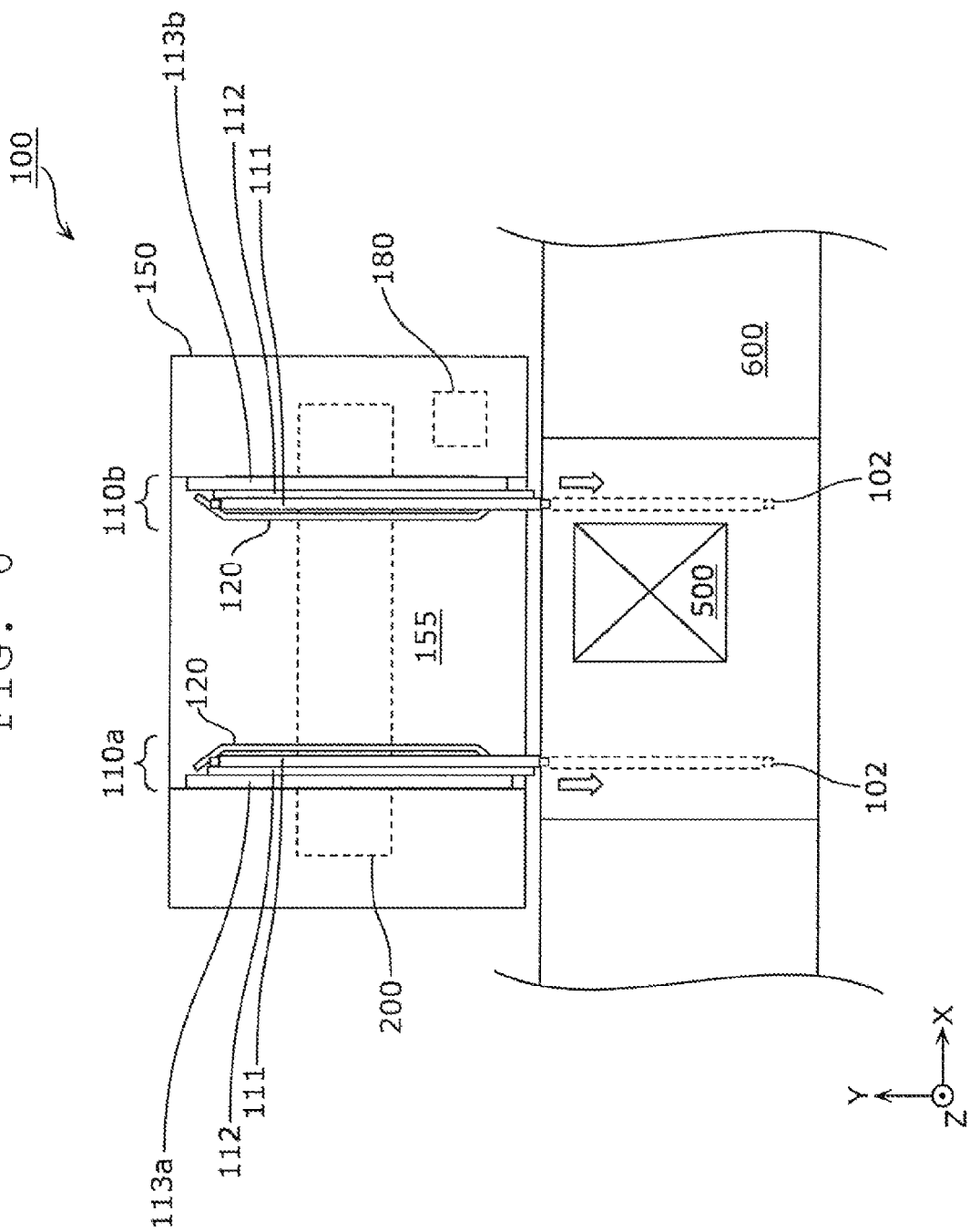
FIG. 6 is a first plan view illustrating an operation at a time when a transport vehicle according to a preferred embodiment of the present invention pulls a cargo.

Further, the position of the right end (hereinafter referred to as a "reference position") of the cargo 500 in FIG. 6 is specified, and the controller 180 of the transport vehicle 100 acquires and keeps the reference position from the host computer, for example.

As illustrated in FIG. 6, the transport vehicle 100 stops in a position facing the cargo 500 which is a cargo to be taken out of the rack 600. Specifically, the transport vehicle 100 stops, for example, in such a position where the top arm 111 of the second arm unit 110b is spaced apart from the reference position by a predetermined distance in the X-axis direction. The predetermined distance is, for example, a distance in which, when the top arm 111 of the second arm unit 110b extends to the front (a lower portion in FIG. 6), the top arm 111 does not interfere with the cargo 500 and the cargo 500 is able to be caught by the hook 102 of the top arm 111. For example, the predetermined distance is about several cm. At this time, the movable first arm unit 110a is stopped, for example, in the farthest position from the second arm unit 110b. That is, the first arm unit 110a waits in a state where the spacing between the pair of top arms 111 is maximized, for example.

Note that a size of the cargo 500 is recorded into the host computer or the like at the time of housing of the cargo 500 into the rack 600, for example, and the controller 180 of the transport vehicle 100 is able to acquire the size from the host computer or the like. Hence, the transport vehicle 100 may cause the movable first arm unit 110a to wait in a state where the spacing between the pair of top arms 111 is slightly (e.g., several cm) larger than a lateral width (a width in the X-axis direction) of the cargo 500.

Subsequently, the controller 180 extends the pair of top arms 111 to the front. Note that a distance of the extension at this time is a distance in which the hooks 102 at the front ends of the pair of top arms 111 exceed positions of the rear end (the lower end in FIG. 6) of the cargo 500 which is a cargo to be taken out.

Figure 7:
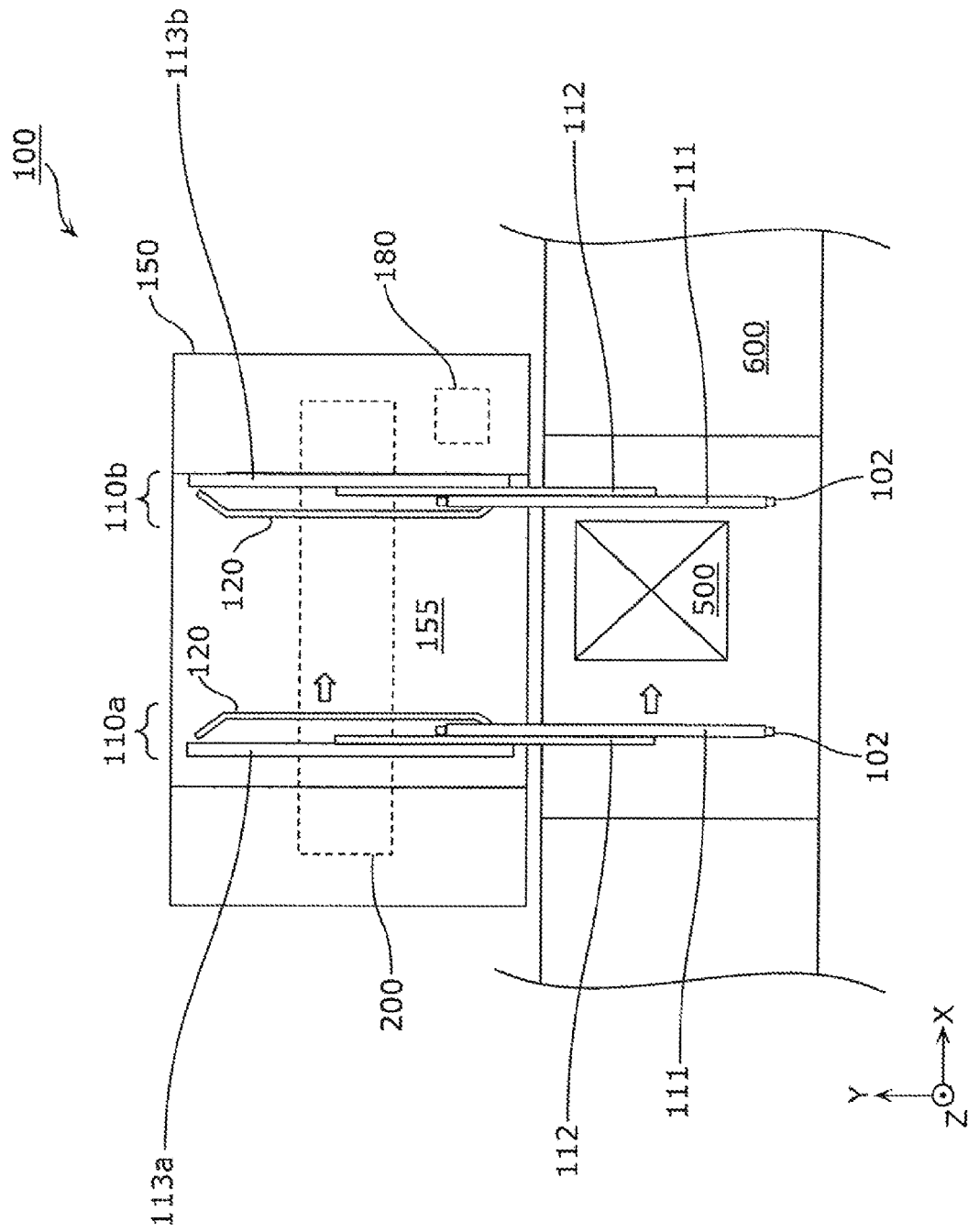
FIG. 7 is a second plan view illustrating an operation at a time when a transport vehicle according to a preferred embodiment of the present invention pulls a cargo.

Next, as illustrated in FIG. 7, the controller 180 moves the first arm unit 110a to the right to reduce the spacing between the pair of top arms 111. Thus, the top arm 111 of the first arm unit 110a gradually approaches the cargo 500.

Figure 8:
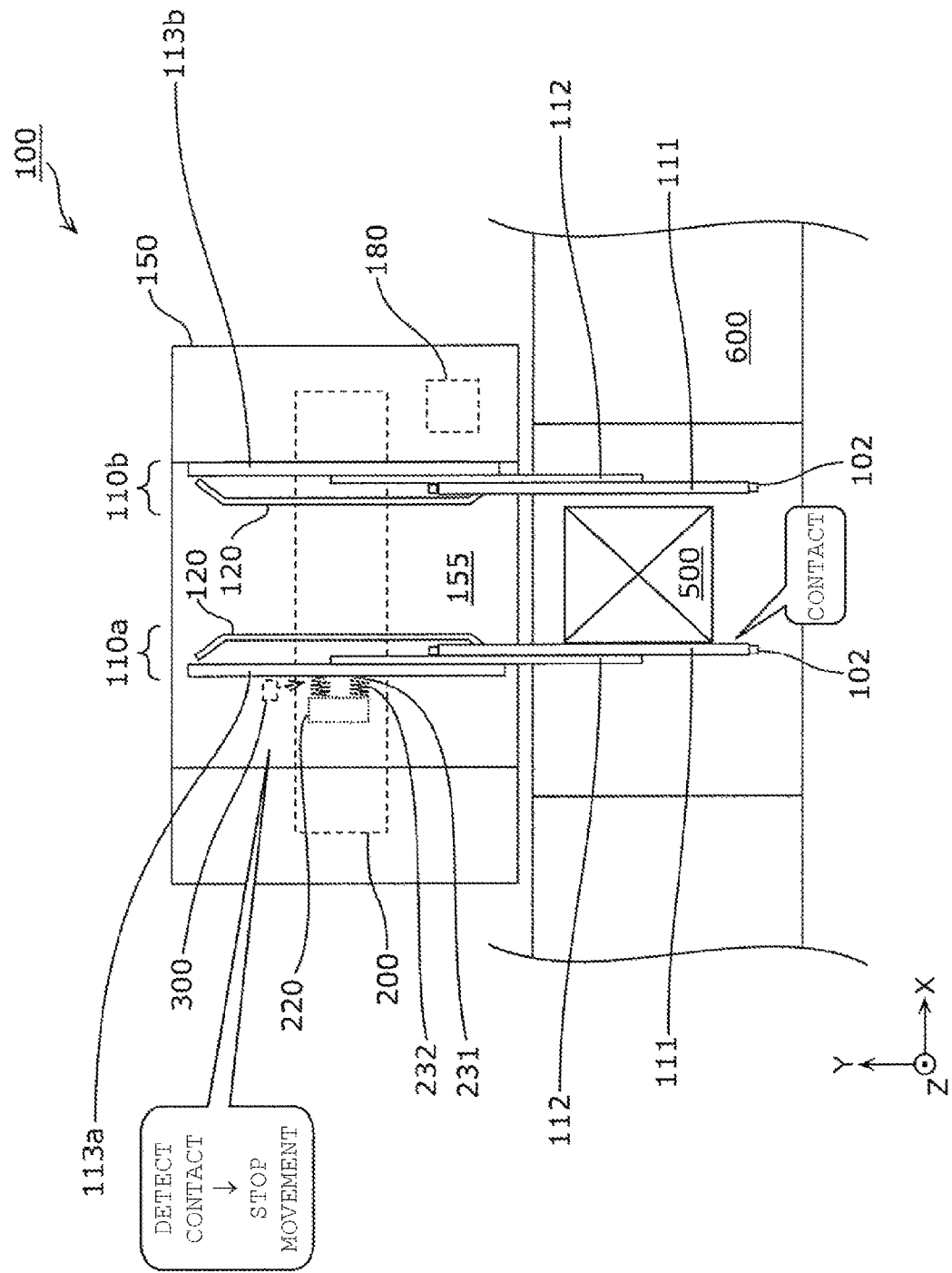
FIG. 8 is a third plan view illustrating an operation at a time when a transport vehicle according to a preferred embodiment of the present invention pulls a cargo.

Subsequently, as illustrated in FIG. 8, the top arm 111 of the first arm unit 110a comes into contact with the left end of the cargo 500. At this time, the first spring 231 and the second spring 232, which have biased the first arm unit 110a (the first base 113a) in the moving direction, contract by receiving reaction force generated by the top arm 111 coming into contact with the cargo 500. More specifically, the second spring 232 with a large spring constant hardly contracts, and the first spring 231 with a small spring constant contracts so as to absorb most of the reaction force. The contact detector 300 thus detects the contact between the top arm 111 of the first arm unit 110a and the cargo 500. The controller 180 having received this detection result controls the adjuster 200 to stop the movement of the first arm unit 110a. At this point, as illustrated in FIG. 8, the top arm 111 of the first arm unit 110a is in contact with the cargo 500, and the top arm 111 of the second arm unit 110b is spaced apart from the cargo 500.

Figure 9:
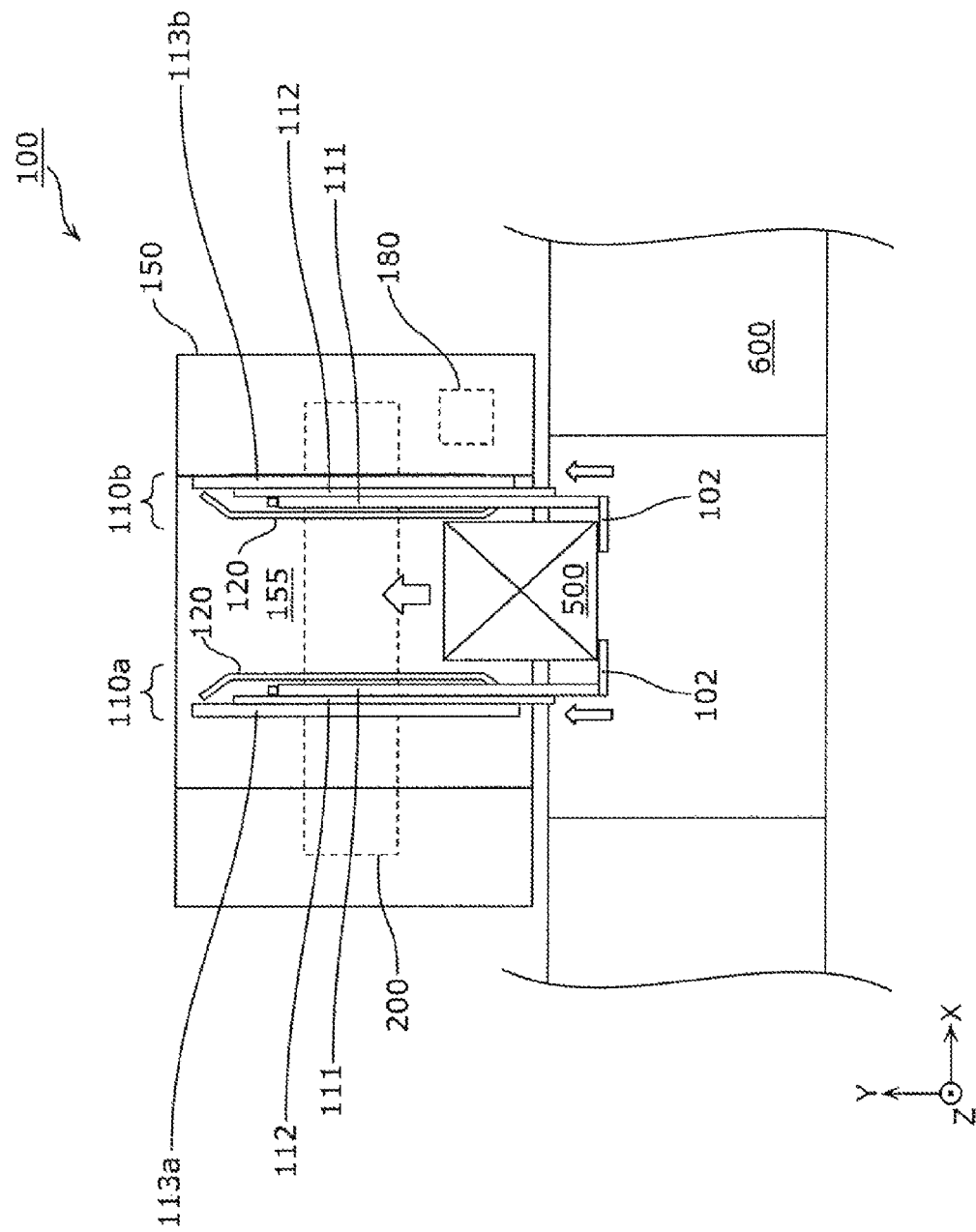
FIG. 9 is a fourth plan view illustrating an operation at a time when a transport vehicle according to a preferred embodiment of the present invention pulls a cargo.

Thereafter, as illustrated in FIG. 9, the controller 180 returns (moves) the first arm unit 110a to the left by a predetermined distance to release the top arm 111 of the first arm unit 110a from the cargo 500. The controller 180 then closes the hooks 102 at the front ends of the pair of top arms 111. Further, by retracting the pair of top arms 111, the controller 180 pulls the cargo 500 caught by the right and left hooks 102 onto the cargo placement surface 155.

Specifically, the controller 180 moves the pair of top arms 111 to the rear side (the Y-axis direction positive-side) from the initial position (cf. FIG. 3A, for example) such that the cargo 500 is located in a predetermined position in a longitudinal direction (the Y-axis direction) of the cargo placement surface 155. The cargo 500 is thus placed in the predetermined position in the longitudinal direction of the cargo placement surface 155.

Note that the predetermined distance at the time of returning the first arm unit 110a to the left is a distance within a range where, when the top arm 111 of the first arm unit 110a is retracted, the cargo 500 is able to be caught by the hook 102 at the front end of the top arm 111. For example, the predetermined distance is about several cm. The pair of top arms 111 are retracted after being brought into a non-contact state with the cargo 500, thus preventing occurrence of a defect such as damage of the cargo 500 caused by, for example, rubbing of the pair of top arms 111 against the cargo 500.

Figure 10:
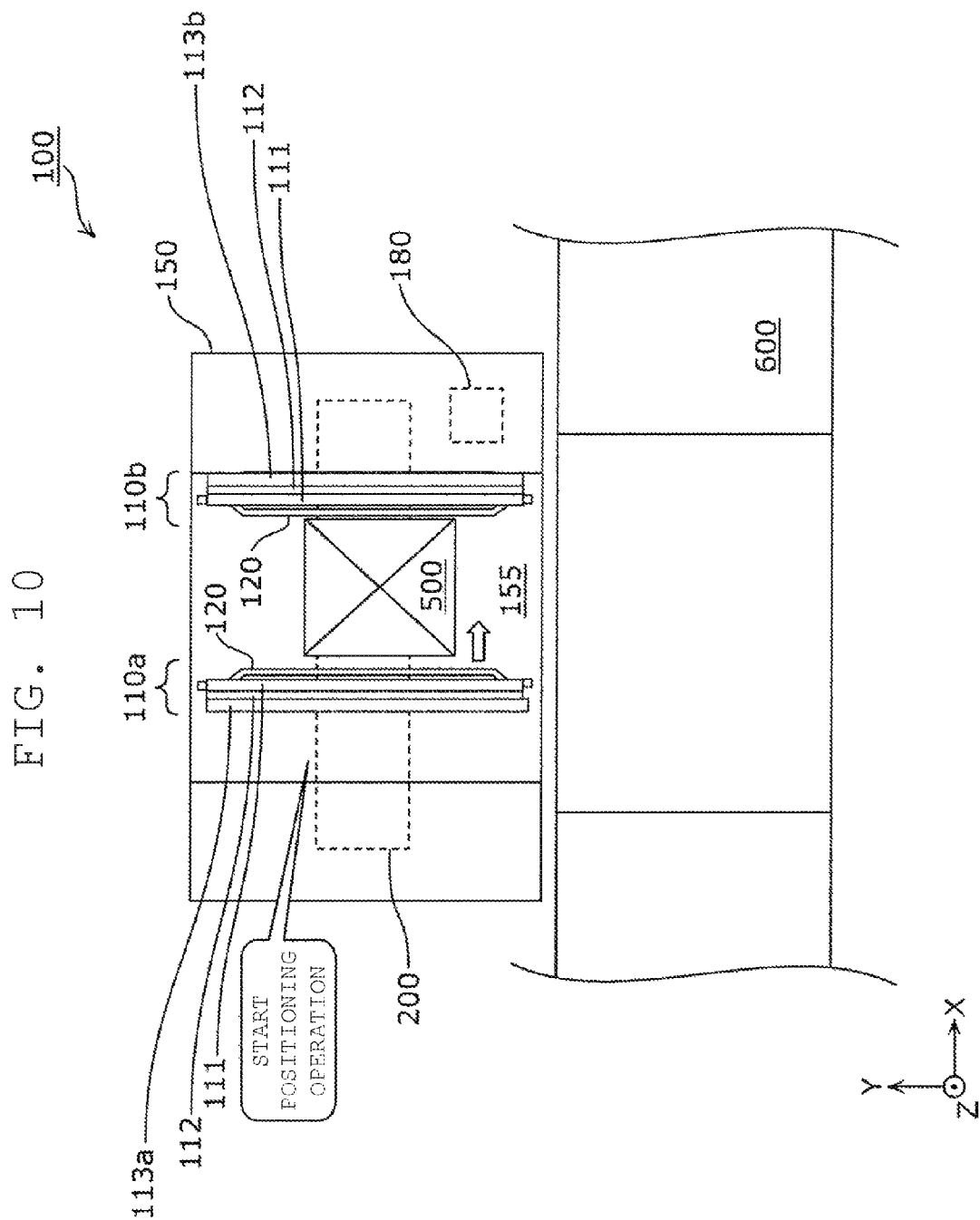
FIG. 10 is a fifth plan view illustrating an operation at the time when the transport vehicle according to a preferred embodiment of the present invention pulls a cargo.

After pulling of the cargo 500 onto the cargo placement surface 155 by the above operation, the controller 180 causes the adjuster 200 to start the positioning operation. Specifically, immediately after pulling of the cargo 500 onto the cargo placement surface 155, the cargo 500 is, for example, in a position not in contact with each of the pair of right and left guides 120. In this state, the controller 180 controls the adjuster 200 to move the first arm unit 110a to the right, as illustrated in FIG. 10. That is, the spacing between the pair of guides 120 is reduced.

Thereafter, the guide 120 of the first arm unit 110a comes into contact with the cargo 500. Thus, first, the sensor 118a disposed in the first arm unit 110a detects that the guide 120 has been pushed (cf. FIG. 4). The controller 180 moves the first arm unit 110a farther to the right. That is, the guide 120 of the first arm unit 110a moves to the right while pushing the cargo 500.

At this time, the first arm unit 110a (the first base 113a) moves by receiving biased force of the first spring 231 and the second spring 232 which are connected in series (cf. FIG. 3A, for example). More specifically, the first spring 231 in the present preferred embodiment is relatively soft in order to accurately detect the contact between the top arm 111 of the first arm unit 110a and the cargo 500. For this reason, at the point when the guide 120 is pushing the cargo 500, the first spring 231 is in an almost fully contracted state, for example. Hence the adjuster 200 greatly biases the guide 120 by use of the second spring 232 which has a larger spring constant than that of the first spring 231 (which is harder than the first spring 231). The adjuster 200 thus moves the cargo 500 in contact with the guide 120 to the right.

As described above, after the start of the positioning operation, the cargo 500 having moved to the right comes into contact with the guide 120 in the second arm unit 110b. Accordingly, the cargo 500 is held between the pair of guides 120. At this time, the sensor 118b in the second arm unit 110b detects that the guide 120 of the second arm unit 110b has been pushed. Thus, the clamping detector 118 acquires, from each of the sensor 118a and the sensor 118b, a detection result showing that the guide 120 has been pushed. In this case, the clamping detector 118 notifies the controller 180 that the cargo 500 is being held between the pair of guides 120.

When receiving the notification, the controller 180 causes the adjuster 200 to stop moving the first arm unit 110a. That is, the positioning operation for the cargo 500, which is performed by reducing the spacing between the pair of guides 120, is stopped.

By the operation of the above example, the cargo 500 housed in the rack 600 is pulled onto the cargo placement surface 155 of the transport vehicle 100, and on the cargo placement surface 155, the cargo 500 is laterally positioned by the pair of right and left guides 120. Subsequently, while maintaining the state (the clamped state) of holding the cargo 500 between the pair of guides 120, the controller 180 moves the transport vehicle 100 to, for example, a position facing a predetermined placement location (a target location) for a shipping conveyor or the like.

Thus, when the cargo 500 is to be placed in the target location by use of the pair of top arms 111, the cargo 500 is able to be placed accurately.

For example, the controller 180 of the transport vehicle 100 extends the spacing between the pair of guides 120 in the position facing the target location, to release the clamped state of the cargo 500. The controller 180 then extends the pair of top arms 111 to the front, with the rear-end hooks 102 in a closed state. The cargo 500 is thus caught by the rear-end hooks 102 and pushed to the target position in front of the transport vehicle 100.

At this time, the cargo 500 is placed in a laterally normal position on the cargo placement surface 155, and it is thus possible to accurately align, for example, the right end of the pushed cargo 500 to the reference position in the target location.

When the target location is the rear of the transport vehicle 100 (in an upper part in FIG. 10), after releasing the clamped state of the cargo 500, the controller 180 of the transport vehicle 100 extends the pair of top arms 111 to the rear, with the hooks 102 at the front end of the pair of top arms 111 in the closed state. The cargo 500 is thus caught by the front-end hooks 102 and pushed to the target position in the rear of the transport vehicle 100. Also in this case, the cargo 500 is placed in a laterally normal position on the cargo placement surface 155, and for example, the right end of the pushed cargo 500 is able to be accurately aligned to the reference position in the target location.

As described above, the transport vehicle 100 according to the present preferred embodiment preferably includes the pair of laterally arranged, extendable and retractable top arms 111; the pair of guides 120 that are disposed below the pair of top arms 111 and arranged laterally; the adjuster 200 that changes a spacing between the pair of guides 120; the cargo placement surface 155 that is disposed below the pair of guides 120 and defines a placement surface for the cargo; the clamping detector 118 that detects whether or not the cargo is being held between the pair of guides 120; and the controller 180 that controls an operation of the pair of top arms 111 and the adjuster 200.

The controller 180 (a) extends and retracts the pair of top arms 111 to pull the cargo onto the cargo placement surface 155, (b) then causes the adjuster 200 to start a positioning operation as an operation to reduce the spacing between the pair of guides 120, and (c) stops the positioning operation when the clamping detector 118 detects that the cargo is being held between the pair of guides 120.

As thus described, in the present preferred embodiment, the pair of laterally arranged top arms 111 extend and retract to pull the cargo into the transport vehicle 100, and thereafter the cargo is held between the pair of the right and left guides 120 located below the pair of top arms 111. Thus, the cargo is positioned.

That is, since the cargo is laterally positioned on the transport vehicle 100, for example, it is not necessary to position the cargo by use of the pair of top arms 111 in a placement location for the cargo before it is pulled (a rack, a conveyor, etc.). Further, since the pair of guides 120 are located below the pair of top arms 111, the cargo pulled into the transport vehicle 100 is held between the pair of guides 120 in a position close to the bottom of the cargo, for example. Thus, for example, even when the cargo is a cargo with a top that is vulnerable to external force, such as an open-top cardboard box or a foldable container, it is possible to prevent the cargo from being substantially deformed. Thus, according to the transport vehicle 100 of the present preferred embodiment, it is possible to significantly reduce or prevent deformation of a cargo to be pulled and place the cargo in a normal position on the transport vehicle 100. As a result, for example, when the cargo is pushed to be placed onto the rack or the like, the cargo is able to be placed in a normal position. As thus described, according to the transport vehicle 100 in the present preferred embodiment, it is possible to transfer the cargo in a safe and accurate manner.

The transport vehicle 100 according to the present preferred embodiment may further include the contact detector 300 that detects that one of the pair of top arms 111 has come into contact with the cargo. In a plan view, the adjuster 200 changes the spacing between the pair of top arms 111 and the spacing between the pair of guides 120, while maintaining a state where the inner surfaces of the pair of guides 120 are located between the pair of top arms 111. The controller 180 (a1) extends the pair of top arms 111, (a2) then causes the adjuster 200 to reduce the spacing between the pair of top arms 111, and (a3) retracts the pair of top arms 111 after the contact detector 300 has detected that the one of the pair of top arms 111 has come into contact with the cargo, to pull the cargo onto the cargo placement surface 155.

With this configuration, the adjuster 200 is able to change both the spacing between the pair of top arms 111 and the spacing between the pair of guides 120. Further, triggered by one of the pair of top arms 111 coming into contact with the cargo, the operation to pull the cargo is able to be started. Hence it is possible to complete pulling of the cargo into the transport vehicle 100 without holding the cargo between the pair of top arms 111 even once.

In the transport vehicle 100 according to the present preferred embodiment, the adjuster 200 may bias one of the pair of top arms 111 by use of the first spring 231 to reduce the spacing between the pair of top arms 111. The contact detector 300 detects a change in length of the first spring 231 to detect that the one of the pair of top arms 111 has come into contact with the cargo. In the present preferred embodiment, the first spring 231 is a pushing spring, and the contact detector 300 detects that an amount of contraction of the first spring 231 has exceeded a threshold, or that a length of the first spring 231 has become a predetermined value or smaller, to detect that the one top arm 111 has come into contact with the cargo.

With this configuration, since one of the pair of top arms 111 moves by biased force generated by the first spring 231, it is possible to reduce a force that is applied to the cargo when the one of the pair of top arms 111 comes into contact with the cargo. Since the contact is detected based on the change in length of the first spring 231 caused by this contact, it is possible to detect the contact with a relatively simple configuration.

In the transport vehicle 100 according to the present preferred embodiment, the adjuster 200 biases one of the pair of guides 120 by use of the second spring 232 with a spring constant larger than a spring constant of the first spring 231, to perform the positioning operation. Specifically, by receiving biased force of the relatively hard second spring 232, the guide 120 in the first arm unit 110*a* moves while pushing the cargo. As a result, the cargo comes into contact with the guide 120 in the second arm unit 110*b*, and accordingly, the cargo is held between the pair of guides 120.

With this configuration, on the cargo placement surface 155 of the transport vehicle 100, positioning of the cargo in a laterally normal position, that is, positioning of the cargo is accurately performed. Since the biased force generated by the second spring 232 is used to hold (clamp) the cargo, even when there is a time lag between the time of detection that the cargo is being held (the clamped state) between the pair of guides 120 and the stoppage of the positioning operation (the clamping operation), it is unlikely that an excessive load is applied to the cargo by the pair of guides 120.

In the transport vehicle 100 according to the present preferred embodiment, one of the pair of guides 120 is mounted to the first base 113*a* that is movably disposed in the cargo placement surface 155, and the other of the pair of guides 120 is mounted to the second base 113*b* whose position with respect to the cargo placement surface 155 is fixed. The adjuster 200 moves the first base 113*a* to perform the positioning operation. The clamping detector 118 detects that the one of the pair of guides 120 is displaced with respect to the first base 113*a* and that the other of the pair of guides 120 is displaced with respect to the second base 113*b*, to detect that the cargo is being held between the pair of guides 120.

With this configuration, by detecting displacement of each of the pair of guides 120 with respect to the member (the first base 113*a* or the second base 113*b*) mounted with the guide 120, it is detected that the cargo is in the clamped state. That is, the clamped state is detected by a mechanical change in each of the pair of guides 120 due to both of the pair of guides 120 coming into contact with the cargo, and accurate detection is thus possible with a relatively simple configuration, for example.

Other Preferred Embodiments

In the above description, transport vehicles have been described based on preferred embodiments and alternative preferred embodiments. However, the present invention is not limited to the preferred embodiments and the alternative preferred embodiments described above. As long as not departing from the gist of the present invention, other preferred embodiments formed by making various modifications to the above-described preferred embodiments or the alternative preferred embodiments, or a configuration formed by combining a plurality of constituent elements described above, are also included in the scope of the present invention.

For example, in the adjuster 200, the nut 220 may move the first base 113*a* not via the first spring 231 or the second spring 232.

In this case, the contact detector 300 may detect the contact between the top arm 111 and the cargo by, for example, detecting distortion of the top arm 111 to the outside, or analyzing an image obtained by capturing an image of the extended top arm 111.

Further, even when the nut 220 directly moves the first base 113*a*, by reducing a time lag between the detection of the contact between the top arm 111 and the cargo and the stoppage of movement of the first base 113*a*, a load applied by the top arm 111 to the cargo is able to be significantly reduced or minimized in a range with substantially no problem.

The same is applicable to the positioning operation for the cargo. That is, even when the nut 220 directly moves the first base 113a, by reducing a time lag between the detection of the clamped state by the pair of guides 120 and the stoppage of movement of the first base 113a, a load applied by clamping is able to be significantly reduced or minimized in a range with substantially no problem.

Further, in the present preferred embodiment, it is assumed that only the first arm unit 110a out of the first arm unit 110a and the second arm unit 110b is laterally movable, for example. However, at least one of the first arm unit 110a and the second arm unit 110b may be movable. That is, when the spacing between the pair of guides 120 is to be changed, only one of the pair of guides 120 may move laterally, or both of the pair of guides 120 may move laterally. In either case, it is possible to clamp the lower portion of the cargo on the cargo placement surface 155 by the pair of guides 120, to thus perform lateral positioning of the cargo.

The type of the sensors 118a and 118b in the clamping detector 118 may not be limited to the photo sensor, and may be other type of sensor. For example, a mechanical switch that is turned on or off when the guide 120 is pressed may be provided as the sensor 118a or 118b.

Moreover, in the present preferred embodiment, it is assumed that the top arm 111 and the guide 120 are both mounted to the first base 113a, and move in the X-axis direction accompanying the movement in the X-axis direction of the first base 113a. However, it is not essential that the top arm 111 and the guide 120 synchronously move in the X-axis direction.

For example, when variations in lateral width (width in the X-axis direction in the present preferred embodiment) of a plurality of cargoes to be taken in is relatively small, the spacing between the pair of top arms 111 may be fixed. Even in this case, after the cargo is taken onto the cargo placement surface 155 by extension and retraction of the pair of top arms 111, the cargo is able to be positioned on the cargo placement surface 155 by being held between the pair of guides 120 disposed below the pair of top arms 111. In this case, for example, a base mounted with the left-side top arm 111 and a base mounted with the left-side guide 120 are separate bodies, and the base mounted with the left-side guide 120 is moved to the right by the adjuster 200. The cargo is thus clamped between the pair of guides 120.

Although it is assumed that the adjuster 200 moves the first arm unit 110a by use of the ball spring, the structure of the adjuster 200 to move the first arm unit 110a is not particularly limited. The adjuster 200 may move the first arm unit 110a by, for example, a linear motor, to change the spacing between the pair of top arms 111 or the spacing between the pair of guides 120.

Although it is assumed that the transport vehicle 100 travels on the travelling track 160 including two rails, the transport vehicle 100 may be, for example, an unmanned transport vehicle that travels on the road surface while checking its own position by a sensor or the like.

Although it is assumed that each of the first arm unit 110a and the second arm unit 110b extends or retracts the top arm 111 by the telescopic structure, the present invention is not limited thereto. For example, the first arm unit 110a may not include the middle arm 112, and the top arm 111 held in the first base 113a slides to extend and retract.

Transport vehicles according to various preferred embodiments of the present invention are preferably transport vehicles that transfer cargo by use of a pair of right and left arms that extend and retract, the transport vehicles being capable of moving the cargo in a safe and accurate manner. Thus, preferred embodiments of the present invention are useful as transport vehicles that transport a cargo in a factory, a distribution warehouse, and the like.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A transport vehicle comprising:
   a pair of laterally arranged, extendable and retractable arms, which pull or push a cargo by use of openable and closable hooks disposed at both ends in a longitudinal direction of each of the pair of arms;
   a pair of guides that are disposed below the pair of arms and arranged laterally;
   an adjuster that changes a spacing between the pair of guides;
   a cargo placement surface that is disposed below the pair of guides and defines a placement surface for the cargo;
   a clamping detector that detects whether or not the cargo is being held between the pair of guides; and
   a controller that controls operations of the pair of arms and the adjuster; wherein
   the controller:
   (a) extends and retracts the pair of arms to pull the cargo onto the cargo placement surface;
   (b) then causes the adjuster to start a positioning operation to reduce the spacing between the pair of guides; and
   (c) stops the positioning operation when the clamping detector detects that the cargo is being held between the pair of guides.

2. The transport vehicle according to claim 1, further comprising a contact detector that detects that one of the pair of arms has come into contact with the cargo; wherein
   the adjuster changes a spacing between the pair of arms and the spacing between the pair of guides, while maintaining a state where inner surfaces of the pair of guides are located between the pair of arms in a plan view, and
   the controller:
   (a1) extends the pair of arms;
   (a2) then causes the adjuster to reduce the spacing between the pair of arms; and
   (a3) retracts the pair of arms after the contact detector has detected that the one of the pair of arms has come into contact with the cargo, to pull the cargo onto the cargo placement surface.

3. The transport vehicle according to claim 2, wherein
   the adjuster biases the one of the pair of arms by use of a first spring to reduce the spacing between the pair of arms; and
   the contact detector detects a change in length of the first spring to detect that the one of the pair of arms has come into contact with the cargo.

4. The transport vehicle according to claim 3, wherein the adjuster biases one of the pair of guides by use of a second spring with a spring constant larger than a spring constant of the first spring, to perform the positioning operation.

5. The transport vehicle according to claim 4, wherein
   one of the pair of guides is mounted to a first base that is movably disposed in the cargo placement surface;

the other of the pair of guides is mounted to a second base whose position with respect to the cargo placement surface is fixed;

the adjuster moves the first base to perform the positioning operation; and the clamping detector detects that the one of the pair of guides is displaced with respect to the first base and that the other of the pair of guides is displaced with respect to the second base, to detect that the cargo is being held between the pair of guides.

6. The transport vehicle according to claim 1, wherein one of the pair of guides is mounted to a first base that is movably disposed in the cargo placement surface;

the other of the pair of guides is mounted to a second base whose position with respect to the cargo placement surface is fixed;

the adjuster moves the first base to perform the positioning operation; and the clamping detector detects that the one of the pair of guides is displaced with respect to the first base and that the other of the pair of guides is displaced with respect to the second base, to detect that the cargo is being held between the pair of guides.

\* \* \* \* \*